US008732237B2

United States Patent
Li et al.

(10) Patent No.: US 8,732,237 B2
(45) Date of Patent: May 20, 2014

(54) INTERACTION-BASED UPDATE DELIVERY FOR USER GENERATED CONTENT

(75) Inventors: Li Li, Beijing (CN); Ju Wei Shi, Beijing (CN); Wen Jie Wang, Shanghai (CN); Jia Jia Wen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 13/306,484

(22) Filed: Nov. 29, 2011

(65) Prior Publication Data
US 2012/0136929 A1    May 31, 2012

(30) Foreign Application Priority Data

Nov. 29, 2010   (CN) .......................... 2010 1 0577038

(51) Int. Cl.
*G06F 15/16*    (2006.01)
(52) U.S. Cl.
USPC ............ 709/203; 709/206; 709/217; 711/126
(58) Field of Classification Search
USPC ....................................... 709/201, 202, 203
See application file for complete search history.

(56) References Cited

U.S. PATENT DOCUMENTS

| | | | | |
|---|---|---|---|---|
| 6,085,226 | A * | 7/2000 | Horvitz .......................... | 709/203 |
| 8,171,128 | B2 * | 5/2012 | Zuckerberg et al. ........... | 709/224 |
| 2002/0091763 | A1 * | 7/2002 | Shah et al. ..................... | 709/203 |
| 2002/0111994 | A1 * | 8/2002 | Raghunandan ................ | 709/203 |
| 2002/0143855 | A1 * | 10/2002 | Traversat et al. ............. | 709/202 |
| 2008/0065701 | A1 * | 3/2008 | Lindstrom et al. ............ | 707/201 |
| 2008/0082633 | A1 * | 4/2008 | Koyama et al. ............... | 709/219 |
| 2008/0120178 | A1 | 5/2008 | Martinez et al. | |
| 2009/0125637 | A1 | 5/2009 | Matuszewski | |
| 2009/0234876 | A1 * | 9/2009 | Schigel et al. ................ | 707/102 |
| 2011/0087842 | A1 * | 4/2011 | Lu et al. ......................... | 711/126 |
| 2011/0256889 | A1 * | 10/2011 | Polis et al. .................. | 455/456.3 |

FOREIGN PATENT DOCUMENTS

WO    2009144688    12/2009

OTHER PUBLICATIONS

Kempe et al., Maximizing the spread of influence through a social network, 2003—KDD '03 Proceedings of the ninth ACM SIGKDD international conference on Knowledge discovery and data mining—pp. 137-146.*

(Continued)

*Primary Examiner* — Jeffrey Nickerson
*Assistant Examiner* — Linh Nguyen
(74) *Attorney, Agent, or Firm* — Jon A. Gibbons; Fleit Gibbons Gutman Bongini & Bianco PL

(57) ABSTRACT

An apparatus and method for assisting in delivering update contents in computer networks are provided. The computer networks also comprise at least one peer client, and the assistant apparatus comprises: an evaluating unit configured to evaluate a user's interaction preference according to the user's interaction history; and a prefetching unit configured to evaluate, in response to the received update notification, whether to prefetch the update contents corresponding to the update notification according to the evaluated interaction preference, and, if prefetching, obtain the update contents from at least one peer client. The corresponding method is also provided. With the apparatus and method in this invention, the update contents in computer networks can be delivered between peer clients, not via the server, which reduces the server load without impairing user experience on client side.

24 Claims, 3 Drawing Sheets

(56) References Cited

OTHER PUBLICATIONS

Kalofonos, D.N., et al., "MyNet: A Platform for Secure P2P Personal and Social Networking Services," Sixth Annual IEEE International Conference on Pervasive Computing and Communications, Mar. 17-21, 2008, ISBN: 978-0-7695-3113-7.

Yeung, C.A., et al., "Decentralization: The Future on Online Social Networking," W3C Workshop on the Future of Social Networking, Barcelona, Spain, Jan. 15-16, 2009.

* cited by examiner

INTERACTION-BASED UPDATE DELIVERY FOR USER GENERATED CONTENT

CROSS-REFERENCE TO RELATED APPLICATIONS

This application is based upon and claims priority from prior Chinese Patent Application No. 201019577038.7, filed on Nov. 29, 2010, the entire disclosure of which is herein incorporated by reference.

TECHNICAL FIELD

This invention relates to computer websites and computer networks, more particularly relates to an assistant apparatus and method for delivering updated contents in computer networks.

DESCRIPTION OF RELATED ART

In recent years, social websites become popular rapidly. According to the statistics in 14 counties around the world, 94% of people knew at least one social website, and 72% of them were users of at least one social website. Take the famous social website Facebook® as an example, according to the statistics in 2009, Facebook already had 112 million users in December 2009. Along with the rapid growth of social websites, the scalability of social websites becomes the issue to be solved.

The existing social websites are generally based on the communication between the client browser and the server. Concretely, user A can update personal contents via the browser, for example, change personal status, upload a photo, publish a post, etc. The browser sends the update contents of user A to the central server. The central server stores the received update contents, obtains by query all friends of user A, for example users F1-F10, and presents the update notification to the friends, usually in form of a content abstract, notifying them that user A has updates when user A visits the central server. If some user of users F1-F10, for example F3, clicks the received update notification, it means that user F3 is interested in the update contents of user A. Then the browser at user F3 side sends a request to the central server. Responding to the request, the central server transmits the update contents of user A to the browser of user F3. Because of the high degree of interconnection among users on social websites, a request from an online user will trigger the central server to query hundreds of the user's friends for updated content, generate a dynamic and customized page for this particular user, and then deliver the page to this user within a short time. Therefore, the rapid growth of user amount brings rapid increase on the server load. Take Facebook as an example, averagely 57% of the 112 million users are online. Additionally, these online users are very active, which presents a great challenge to the server load. The conventional solutions for the server load problem include extending the server-side infrastructure and building a cache layer for high-speed data accessing. Presently the infrastructure of Facebook has reached ten thousand machines including about 1800 MySQL servers, wherein MySQL servers are responsible for saving user profiles and other additional information, while other servers for saving photos and other user data. For the construction of the cache layer, the high degree of interconnection among users makes partitions of user data inefficient. Some social websites normalize user data and randomly distribute them among thousands of infrastructure servers, and then deploy a distributed cache to ensure most of the active data are kept in memory for fast retrieving. It can be seen that the above solutions require significant investments on the infrastructure and engineering, which becomes a huge burden for social website operators.

Because of the high degree of interconnection among users in social websites, P2P (peer-to-peer) solution may be capable for solving the scalability problem of social websites. Actually, P2P technology has been successfully used to address several scalability challenges arisen from applications that formerly relied on centralized servers, such as Skype® and Bittorrent®. However, issues exist when P2P solution is used to social websites. First is Page Load Latency problem. Page Load Latency is one of the major metrics for user experience in social websites. Usually users expect the page response time of Web browser to be less than 2 seconds, nevertheless, the latest development of Web interaction makes users expect even shorter page response time. If P2P is used to load the page contents on-demand, the loading time may greatly exceed user expectation because of the bandwidth limitation. Besides, using P2P to deliver contents in social websites, peer reachability and reliability should also be taken into consideration. Using P2P solution, situations like user offline and connection problem may happen, which may influence the page loading reliability and thus the user experience. Thus, how to apply P2P solution to social websites in order to increase their scalability and at the same time to reduce the impact on user experience becomes a great challenge.

SUMMARY OF THE INVENTION

In view of the above problems, this invention is provided to reduce the central server load of social networks without obviously impairing user experience.

According to one aspect of the invention, a client-side assistant apparatus for assisting in delivering update contents in a social network is provided, wherein the social network further comprises at least one peer client which can communicate with the assistant apparatus, the assistant apparatus comprising: an evaluating unit configured to evaluate a user's interaction preference according to the user's interaction history; and a prefetching unit configured to evaluate, in response to an update notification received from the central server of the social network, whether to prefetch the update contents corresponding to the update notification according to the evaluated interaction preference, and, if prefetching, obtain the update contents from at least one peer client in a P2P manner and store them locally.

According to the other aspect of the invention, a method for assisting in delivering update contents in a social network is provided, wherein the social network comprises at least one peer client, the method comprising: evaluating a user's interaction preference according to the user's interaction history; in response to an update notification received from the central server of the social network, evaluating whether to prefetch the update contents corresponding to the update notification according to the evaluated interaction preference; and, if prefetching, obtaining the update contents from at least one peer client in a P2P manner and storing them locally.

With the assistant apparatus and method of this invention, P2P communication can be applied to deliver the update contents in social networks, which can reduce the central server load and increase the scalability of social networks without obviously impairing user experience.

DETAILED DESCRIPTION OF THE PREFERRED EMBODIMENT

The following is the description of the embodiments in connection with the drawings. It is understood that the detailed description is illustrative, rather than restrictive, to the present invention.

In the existing social networks, the high degree of the interconnection among users and the high online ratio of users provide ideal environment for sharing data among users in a P2P manner. On the other hand, the research on the existing social networks shows that although a user may have hundreds of connected users, i.e. "friends" in social networks who update contents frequently, the update contents that the user actually interact with usually only focus on a certain part of all update contents. For example, generally speaking, even a user has hundreds or thousands of friends in social networks, the number of the friends interacting with the user is often stable, which is much smaller than the total number of the friends. Alternatively, facing with so many updates of friends in social networks, the contents that a user is interested in and interacts with are usually a certain part in particular types or themes, for example, some users always like browsing photo updates of their friends, some users would like to browse travel-related update contents, etc. Therefore, if the contents with highest possibility of being interacted with the user can be determined and stored to users' local machine in a P2P manner in advance, it is possible to apply P2P solution to social networks without impairing user experience. Based on such concept, in the embodiments of the invention, user's interaction preference is determined according to the interaction history with his/her friends. Once receiving an update notification of a friend, it is evaluated whether to prefetch the update contents according to the interaction preference. If yes, the update contents are obtained in a P2P manner from other clients in social networks, and thereby the central server load is reduced. Meanwhile, because the possible update contents have been prefetched, when the user clicks and views a friend's update contents, the update contents can be presented directly from the local machine without impairing user experience. Thus the effective delivery of update contents in social networks can be realized.

Figure 1:
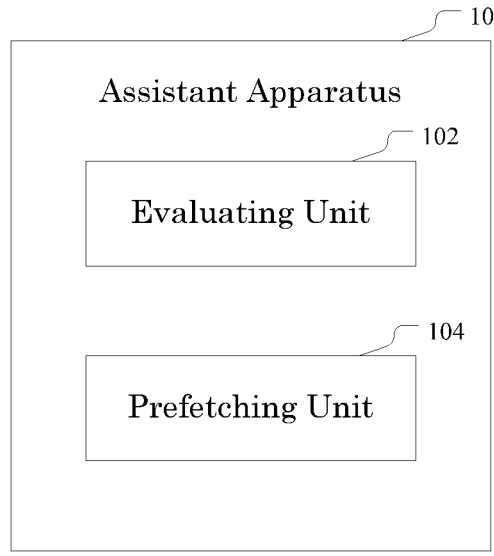
FIG. 1 is a block diagram of client-side assistant apparatus 10 according to one embodiment of the invention.

FIG. 1 is a block diagram of client-side assistant apparatus 10 according to one embodiment of the invention, wherein the assistant apparatus 10 is configured to assist in delivering update contents in social networks which also comprise a plurality of peer assistant apparatuses corresponding to assistant apparatus 10. In one embodiment, the assistant apparatus 10 can be implemented as a browser plug-in. In another embodiment, the assistant apparatus 10 can act as a desktop application provided by social websites or a third-party, or a functional component of a desktop application. From the viewpoint of implementation, the assistant apparatus 10 comprises an evaluating unit 102, configured to evaluate a user's interaction preference according to the user's interaction history; and a prefetching unit 104, configured to, in response to the received update notification, judge or evaluate whether to prefetch update contents corresponding to the update notification according to the evaluated interaction preference, and, if yes, obtain the update contents from at least one peer assistant apparatus and store them locally.

Specifically, by capturing user operations or capturing the communication data of the browser such as the sent requests and the received data, the evaluating unit 102 can get the dynamic interaction information of the user in a period, like clicking, browsing or commenting on friends' updates, and further get the user's interaction history. Alternatively, the evaluating unit 102 can read and analyze the interaction history recorded by other modules. By analyzing a user's interaction history, the evaluating unit 102 can determine the user's interaction preference on content types, content themes, friends, etc.

The interaction preference obtained by the evaluating unit 102 can be used to evaluate whether the user would be interested in the subsequent updates from the friends. Specifically, once a friend updates the contents, the assistant apparatus will receive an update notification from the central server, which generally contains the summary information, such as the time, the type, the title of the update, etc. The prefetching unit 104 analyzes the received update notification and evaluates or judges whether the update contents corresponding to the update notification comply with the interaction preference evaluated by evaluating unit 102. If yes, the prefetching unit 104 considers the update contents worthy to be prefetched, and thus obtains the update contents from other peer clients in social networks which probably store the update contents and then save them locally.

As described above, the prefetching unit 104 selects and prefetches the update contents of various friends based on the interaction preference from the evaluating unit 102. There are various implementations for the interaction preference evaluation in the evaluating unit 102 and the update content selection in the prefetching unit 104, which will be described as follows in connection with several embodiments.

In one embodiment, the evaluating unit 102 creates a content type list according to the content type of each interaction contained in the user's interaction history. The content type list is used to record the most frequently interacted content types, so as to reflect the user's interaction preference. For example, in one embodiment, the evaluating unit 102 classifies update contents into several types, including status update, photo update, blog update, etc., and counts user interactions based on the classification. In one instance, user's clicking on the update contents of type 1 will increase interaction Num (type1), the clicking on the update contents of type 2 will increase interaction Num (type2), and thereby the interaction number of each content type can be obtained. Based on such statistics, the evaluating unit 102 regards one or several types with the highest interaction number as the most frequently interacted content types and records them in the content type list. Therefore, the content types recorded in the content type list are the user's most interested content types in a past period and also the content types with the most possibility of interaction in the future.

In this case, once receiving an update notification, the prefetching unit 104 will determine the type of the corresponding update contents by analyzing the update notification. If the update content type is included in the content type list, the prefetching unit 104 will prefetch the update contents.

In one embodiment, the evaluating unit 102 creates a keyword list according to the keywords involved in the interactions contained in a user's interaction history. The keyword list is used to record the keywords of the most frequently interacted contents, so as to reflect the user's interaction preference. In this case, the evaluating unit 102 can further comprise a keyword extracting module (not shown), the algorithm of which can be any existing keyword extracting method as long as the extracted keywords can reflect the user's interested themes from some point of view. Therefore, the keywords recorded in the keyword list can reflect the user's interested content themes in a past period and thus the update contents with such themes are most possibly interacted contents in the future. For example, in one embodiment, a user clicked 5 blogs related with food, 10 photos with "food" or "restaurant" in the name, 2 blogs for travel and 1 comment about entertainment news in a certain period, then by analyzing the keywords, the evaluating unit 102 can add the most frequent keywords like "food" and "travel" into the keyword list, so as to reflect the user's interested content themes.

In this case, once receiving an update notification, the prefetching unit 104 analyzes the notification, extracts the keywords in it and determines its theme. If the keywords of this update notification are contained in the above keyword list, then the prefetching unit 104 will prefetch the update contents corresponding to the update notification.

In one embodiment, the evaluating unit 102 creates a friend list according to the friends involved in each interaction contained in a user's interaction history. The friend list is used to record the most frequently interacted friends of the user so as to reflect the interaction preference of the user.

In one example, suppose that a user n of the assistant apparatus 10 has $M_n$ associated users m, i.e., friends, in a social network, each friend respectively labeled 0, 1, 2, . . . , $M_n$. When a friend makes an update, the assistant apparatus 10 will receive an update notification from such friend. Therefore, the evaluating unit 102 can get $a_m$ updates of friend m in a period by counting the update notifications. On the other hand, by referring to the friends involved in each interaction in the interaction history, the evaluating unit 102 can get $C_{m,n}$ interactions between the user n and the friend m in a period. The concern degree $d_m$ of the user n to the friend m can be presented by the ratio of interactions $C_{m,n}$ to updates $a_m$, i.e., $d_m = C_{m,n}/a_m$. A threshold H can be set for the concern degree $d_m$, and any friend whose concern degree is higher than the threshold H will be added to the friend list.

In this case, once receiving an update notification, the prefetching unit 104 will judge the friend involved in the update notification. If the involved friend is contained in the above friend list, then the prefetching unit 104 will prefetch the corresponding update contents.

In the case that the evaluating unit 102 creates a friend list, the prefetching unit 104 judges whether to prefetch the update contents based on the friend list. Therefore, how to choose friends into the friend list directly influences the judgment on contents by the prefetching unit 104. Of course, it is expected that the choosing of the friends in the friend list can benefit the later prefetching, that's, increasing the hit ratio of the prefetching and reducing the bandwidth consumption caused by the prefetching as much as possible. So, the evaluating unit 102 can adopt more comprehensive algorithm to optimize the above friend choosing by considering more factors like the hit ratio, the bandwidth consumption, etc.

In one example, in the case of prefetching based on the friends, the evaluating unit 102 considers hit ratio $h_n$ of prefetching as follows:

$$h_n = \sum_{m=0}^{M_n-1} p_{m,n} \cdot s_{m,n} = \sum_{m=0}^{M_n-1} \frac{c_{m,n}}{\sum_{m=0}^{M_n-1} c_{m,n}} \cdot s_{m,n}$$

Wherein $P_{m,n}$ is the ratio of interaction times $C_{m,n}$ between user n and user m to the total interaction times of user n; $S_{m,n}$, whose value is 1 or 0, is the flag indicating whether to add user m, i.e. the friend of user n, into the friend list. When $S_{m,n}$ is 1, it means that user m should be added into the friend list and thus the update contents of user m should be prefetched, while $S_{m,n}$ of 0 means that user m should not be added into the friend list and thus the update contents of user m should not be prefetched.

Obviously, when all $S_{m,n}$ are 1, $h_n$ is 1. It is easy to understand because if the evaluating unit 102 adds all friends of user n into the friend list, then the prefetching unit 104 will prefetch the update contents of all friends, and then user n can find all update contents in the cache or prefetching area.

However, prefetching the information of all friends m will consume a lot of bandwidth. Therefore, the evaluating unit 102 also considers bandwidth consumption $w_n$ which represents the bandwidth consumption caused by prefetching.

$$w_n = \frac{\sum_{m=0}^{M_n-1} ((a_m - c_{m,n}) \cdot s_{m,n})}{\sum_{m=0}^{M_n-1} (a_m - c_{m,n})}$$

In the above formula, the denominator denotes the total number of un-interacted updates that a friend of user n has taken but user n doesn't interact with, and the numerator denotes the number of the un-interacted but prefetched updates. So, $w_n$, can represent the normalized wasted bandwidth consumption caused by those un-interacted updates. Obviously, when all $S_{m,n}$ are 1, $w_n$, is 1, meaning that the bandwidth consumption is the largest.

To balance between the hit ratio and the bandwidth consumption, a utility function $U_n$, can be defined:

$$U_n = \frac{h_n}{a + bw_n}$$

Wherein a and b are two parameters to balance the weight of $h_n$ and $w_n$. In the above formula, obviously when $h_n$, is larger, the hit ratio is higher and the utility is higher; when $w_n$, is larger, the bandwidth waste is more and the utility is lower. Therefore, the evaluating unit 102 evolves the problem of how to create a friend list into the problem of how to choose a set $\{S_{0,n}, S_{1,n}, \ldots, S_{M-1,n} | S_{m,n}=0 \text{ or } 1\}$ to make the largest utility.

In one example, the evaluating unit 102 traverses all possible combinations of the above set, substitutes them into the utility function $U_n$, finds the optimized set which makes the largest utility, and creates the friend list according to the optimized set. The set number to be calculated in this manner is in the order of $2^{M_n}$.

In one example, the evaluating unit 102 adopts heuristic methods to simplify the above process of finding the optimized set. Specifically, the concern degree $d_m C_{m,n}/a_m$ can be set as heuristic value. For $M_n$ friends of user n, the concern degree $d_m$ to each friend m of user n is ordered from large to small to obtain a sequence. In this sequence, one $d_m$, for example di, is selected as the supposed threshold. For user m whose concern degree is larger than di, the corresponding $S_{m,n}$ is set as 1, otherwise set as 0, then the utility function is calculated. Because the selection of di has $M_n$ possibilities at most, $M_n$ utility values can be calculated at most. Taking the supposed threshold which makes the largest utility value as the final threshold, the ideal set $\{S_{0,n}, S_{1,n}, \ldots, S_{Mn-1,n}\}$ can be obtained in order to choose friends and create the friend list. In this example, the number of the sets to be calculated is reduced approximately to $M_n$, which increases the feasibility of the calculation.

For the approaches to create the friend list, it is understood that those skilled in the art can make some modification on the above methods and use other manner to realize the selection of friends. For example, in one embodiment, other parameters like $C_{m,n}$ can be used as heuristic value to find the ideal $S_{m,n}$ set; in another embodiment, parameter a and parameter b can be adjusted in order to change the weight of the hit ratio and the bandwidth consumption; in yet another embodiment, utility functions in other forms can be adopted as long as they can reflect the relation between the prefetching effect and the hit ratio and the bandwidth consumption. In some simplified embodiments, other parameters like interaction number, interaction frequency, etc. can be judged directly and the friend whose parameters are larger than the pre-set thresholds can be added into the friend list.

Moreover, although the embodiments that the evaluating unit 102 obtains the interaction preference by creating a content type list, a keyword list or a friend list are described in detail, the interaction preference is not limited to the above-described examples. For example, in one embodiment, the analysis on the interaction history probably shows that a user always prefers interacting with "hot" topics. That is, facing an update, if the user finds that many friends, for example 5, have interacted with the update contents, then the user will concern this update in a great possibility. In this case, the interaction preference may include a threshold parameter, which represents the current concern degree of an update when the user interacts with the update. It is understood that besides the above-described embodiments, those skilled in the art can analyze other features of the interaction history according to needs in order to evaluate a user's interaction preference. Moreover, in different embodiments, the above-described approaches for getting the interaction preference can be combined, for example creating both a content type list and a friend list, in order to represent the interaction preference more exactly. Correspondingly, based on the interaction preference in different embodiments, the prefetching unit 104 can select and prefetch the update contents from different aspects.

When prefetching the update contents, the prefetching unit 104 can acquire the update contents from the peer client using the existing P2P technique. In one embodiment, the prefetching unit 104 can send a request to the client where a friend makes an update and get the update contents directly from the source client in a P2P manner. Besides, because of the interconnectivity among users in social networks, there exists interconnectivity among the clients of each user. Therefore, in one embodiment, the prefetching unit 104 can obtain the update contents indirectly from other clients connected with the source client, using "friends of friends" as relay. According to the distribution of the update contents among the friends, the prefetching unit 104 can also get the update contents from multiple peer clients at the same time.

In the above embodiments, once receiving an update notification, the prefetching unit 104 selectively prefetches the update contents for user's interaction. When a user publishes an update, in order to make the friends of the user can also prefetch the update contents in the same way, in one embodiment, the assistant apparatus 10 further comprises a publishing unit (not shown), configured to publish the update contents. Specifically, when a user publishes an update through the browser, besides conventionally sending the update content to the central server, the publishing unit also stores them locally, in order to allow the friends of the user to fetch the update contents when needed.

As above-described, the update contents in social networks are delivered between peer clients in a P2P manner. To improve the delivery efficiency, a network management device can also be arranged in social networks, configured to deploy the network transmission between peer clients. Specifically, different clients may have different network types, i.e. NAT gateway types, including open, IP restricted, port restricted, UDP disabled, etc. The clients in particular gateway type can only communicate with the clients in the corresponding gateway type, for example, the clients with IP restricted can communicate with all clients except those with UDP disabled, while the clients with UDP disabled can only communicate with the clients in open type. To this end, the network management device can record the network type of each client and the network types it can communicate with. Moreover, the network management device can also assign a unique ID for each update content and record the distribution of each update content among multiple peer clients taking the ID as the index. There usually exist similar network management devices in the existing P2P networks, which manage and coordinate the network transmission between peer nodes. The network management device can also record more information according to needs in order to manage P2P network transmission more efficiently.

In the case that social networks have network management devices, the assistant apparatus 10 can better prefetch and share update contents by communicating with network management devices.

Figure 2:
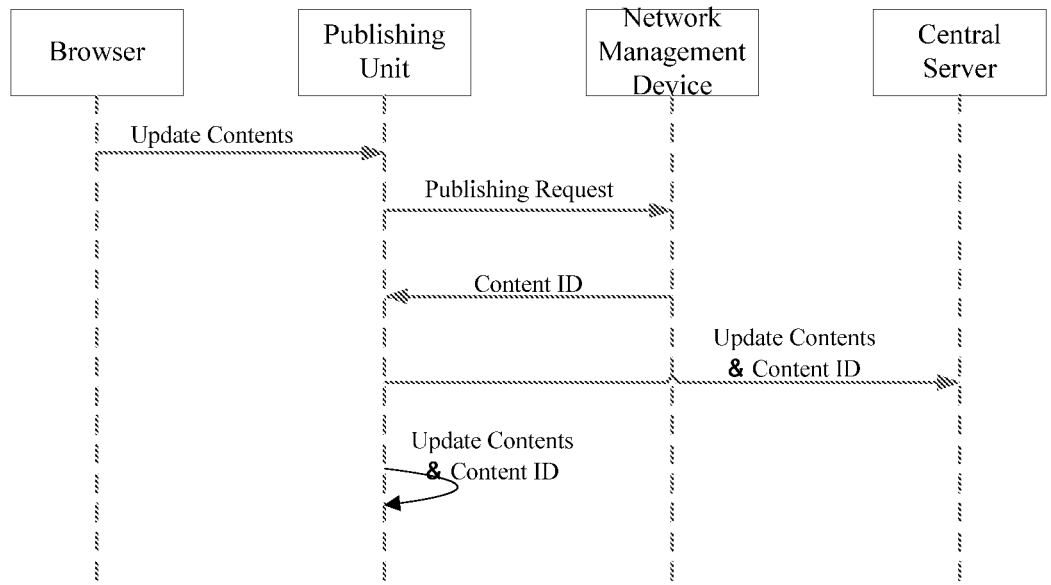
FIG. 2 illustrates the sequence of publishing update contents by the publishing unit according to one embodiment of the invention.

FIG. 2 illustrates the sequence of publishing update contents by the publishing unit according to one embodiment of the invention. As shown in FIG. 2, when a user publishes an update through the browser, the publishing unit firstly obtains the update contents to be published from the browser. Then, the publishing unit sends a publishing request to the network management device. The network management device assigns a unique ID for the contents to be published and returns it to the publishing unit. Then the publishing unit stores the update contents together with the obtained content ID locally. Besides, the publishing unit also conventionally sends the update contents to the central server, with the content ID embedded in the update contents, such that the central server can incorporate the content ID when generating the update notification.

Figure 3:
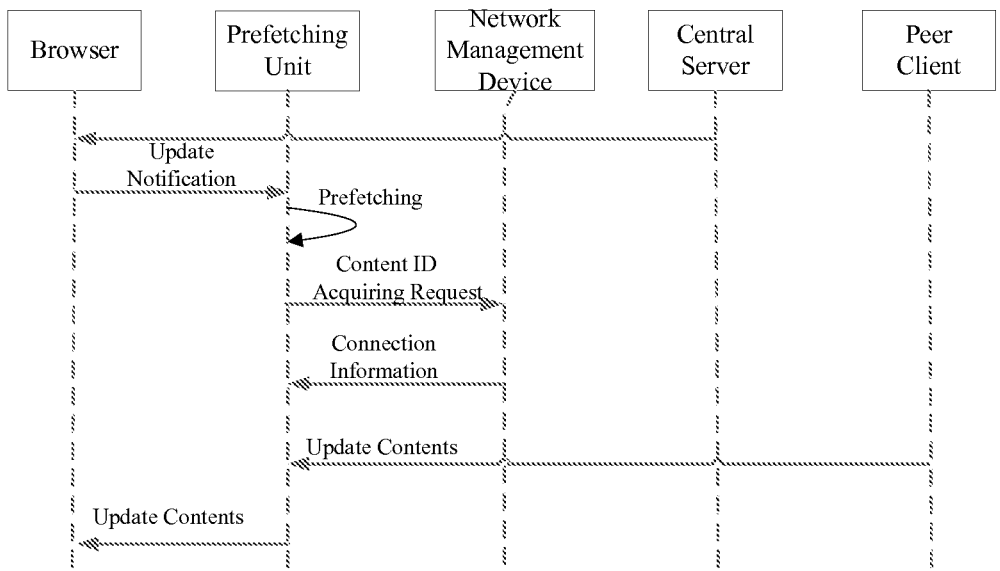
FIG. 3 illustrates the sequence of prefetching update contents by the prefetching unit according to one embodiment of the invention.

FIG. 3 illustrates the sequence of prefetching update contents by the prefetching unit according to one embodiment of the invention. As shown in FIG. 3, when receiving an update notification from the central server, the prefetching unit judges whether to prefetch the corresponding update contents by referring to the interaction preference as described above. If decided to perform prefetching, the prefetching unit extracts the embedded content ID from the update notification and sends an acquiring request to the network management device using the content ID. Referring to the network type of each client and the distribution of the update contents corresponding to the content ID among those clients, the network management device returns the connection information to the prefetching unit, which contains the addresses and network types of the clients that have the needed update contents stored. With such connection information, the prefetching unit can get the update contents from peer clients efficiently and send them to the browser to display at a proper time.

It is understood that, although it is described the embodiments of delivering update contents in a P2P manner with the assistance of network management devices, the process for delivering update contents are not restricted to the above examples, and can be realized by various P2P techniques. There have conducted comprehensive research on implementations in P2P techniques, and thus those skilled in the art can adopt proper techniques according to needs to deliver update contents in social networks.

Figure 4:
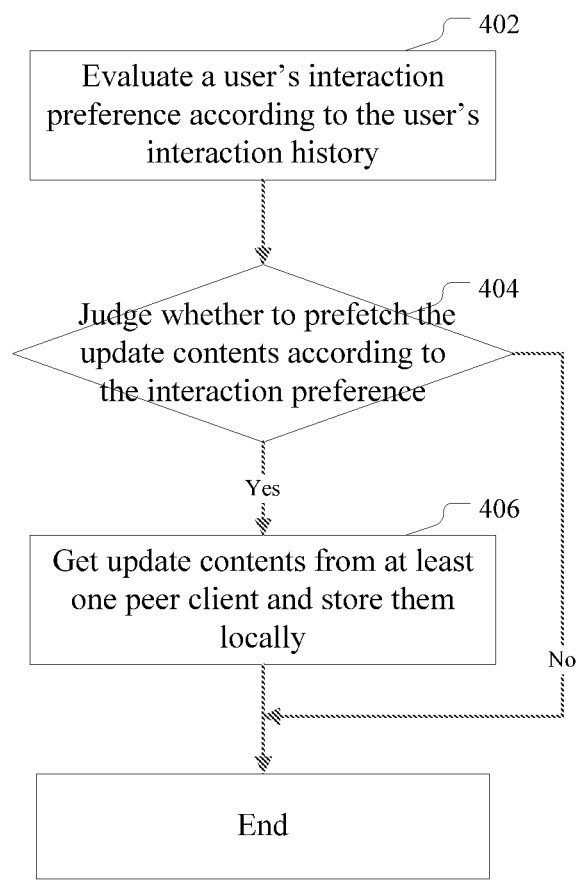
FIG. 4 is a flowchart of the method according to one embodiment of the invention.

Based on the same concept, this invention also provides a method corresponding to the above assistant apparatus. FIG. 4 is a flowchart of the method according to one embodiment of the invention, which is used for assisting in delivering update contents in social networks that comprise a plurality of peer clients. As shown in the figure, the above method comprises, step 402 for evaluating the interaction preference of a user according to the user's interaction history; step 404 for judging, in response to the received update notification, whether to prefetch the update contents corresponding to the update notification according to the evaluated interaction preference; if the judging result of step 404 is yes, then at step 406, the update contents are obtained from at least one peer client and stored locally.

In one embodiment, at evaluating step 402, a content type list is created according to the content type of each interaction contained in the user's interaction history. The list records the most frequently interacted content types of a user so as to reflect the interaction preference of the user.

In this case, at step 404, once receiving an update notification, the type of the corresponding update contents is determined by analyzing the update notification, and it is judged whether such type is contained in the content type list.

In one embodiment, at evaluating step 402, a keyword list is created according to the keywords involved in each interaction contained in the user's interaction history. The keyword list records the keywords of the most frequently interacted contents of a user so as to reflect the interaction preference of the user.

In this case, at step 404, once receiving an update notification, the keywords are extracted by analyzing the update notification and it is judged whether they are contained in the keyword list.

In one embodiment, at evaluating step 402, a friend list is created according to the friends involved in each interaction contained in the user's interaction history. The friend list records the most frequently interacted friends of a user so as to reflect the interaction preference of the user. The detail embodiments of creating a friend list are as described referring to the assistant apparatus, which is needless to describe again.

In this case, at step 404, once receiving an update notification, the friend involved in the update notification is determined and it is judged whether such friend is contained in the friend list.

Although the examples of evaluating step 402 and judging step 404 are described, it is understood that the two steps have various implementations. Those skilled in the art can adopt proper implementations of step 402 and 404 according to needs.

When the judging result of step 404 is yes, at step 406, the update contents are obtained from the peer clients using the existing P2P techniques and stored locally. In one embodiment, a request is sent to the client where the update content is generated, and the update contents are obtained directly from the source client in a P2P manner. In another embodiment, the update contents are obtained indirectly from other clients connected with the source client, using "friends of friends" as relays.

Furthermore, when a user publishes an update, in order to allow the friends to prefetch the update contents in the same way, in one embodiment, the method further comprises a publishing step for publishing the update contents. Specifically, at the publishing step, besides conventionally sent to the central server, the update contents are also stored locally to allow the friends of the user to request the update contents when needed.

As described above, the update contents in social networks are obtained in a P2P manner among the peer clients. In order to improve the transmitting efficiency, social networks may also comprise a network management device, configured to deploy the network transmission between the peer clients. Specifically, the network management device can record the network type of each client, and the network types that each client can communicate with. Besides, the network management device can also assign a unique ID for each update content, and record the distribution of each update content among multiple peer clients using the ID as the index.

When social networks have the network management device, the above update content publishing step and obtaining step can be realized as following.

Figure 5:
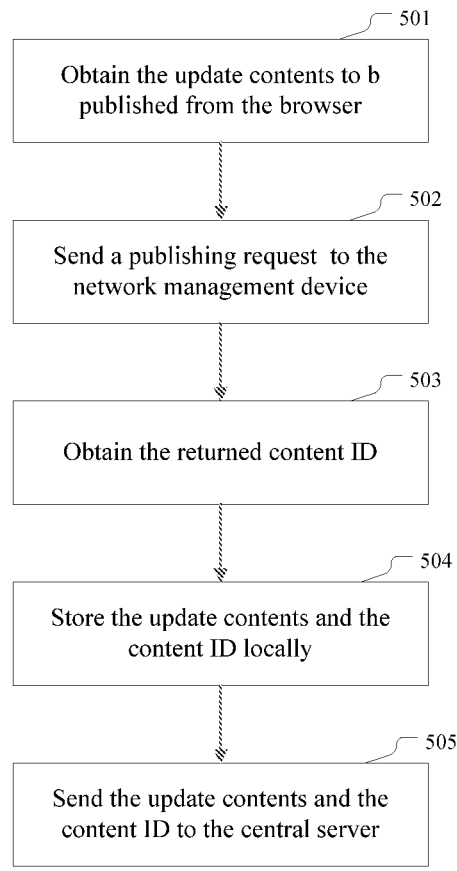
FIG. 5 illustrates the flowchart of the publishing step according to one embodiment of the invention.

FIG. 5 illustrates the flowchart of the publishing steps according to one embodiment of the invention. As shown in FIG. 5, at step 501, the update contents to be published are obtained from the browser. Then at step 502 a publishing request is sent to the network management device. The network management device assigns a unique ID for the contents to be published and returns it to the publishing unit. Therefore, at step 503, the returned ID can be obtained, and at step 504, the update contents together with the content ID are stored locally. Finally at step 505, the update contents are sent to the central server, with the content ID embedded in it, such that the central server can incorporate the content ID when generating the update notification.

Figure 6:
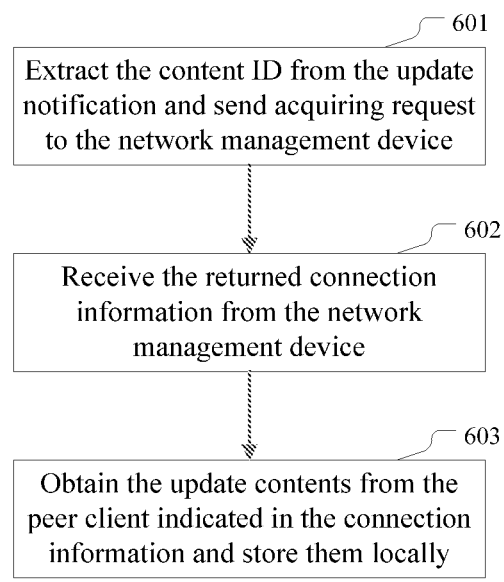
FIG. 6 illustrates the flowchart for prefetching update contents according to one embodiment of the invention.

FIG. 6 illustrates the flowchart for prefetching update contents according to one embodiment of the invention. As shown in FIG. 6, at step 601, the embedded content ID is extracted from the update notification, and a request is sent to the network management device using the ID. At step 602, the connection information is received from the network management device, which contains the addresses and the network types of the clients where the needed update contents are stored. Then at step 603, with such connection information, the needed update contents are obtained from the peer clients indicated in the connection information and stored locally.

With the above embodiments of the method, when the received update notification accords with the interaction preference, the corresponding update contents can be prefetched from the peer clients, thereby reducing the central server load. At the same time, because the update contents have been prefetched, the user experience when requesting to interact with the update contents will not be impaired. It is understood that the method of this invention is not restricted to the above embodiments, but can be modified according to needs. The modified embodiments are as described referring to the assistant apparatus, which is needless to describe again.

Through the above description of the embodiments, those skilled in the art will recognize that the above method and apparatus for assisting in delivering update contents in social networks can be practiced by executable instructions and/or controlling codes in the processors e.g. codes in mediums like disc, CD or DVD-ROM; memories like ROM or EPROM; and data carriers like optical or electronic signal carrier. The apparatus and its units can be realized using hardware like VLSI or Gates and Arrays, like semiconductors e.g. Logic Chip, transistors, etc., or like programmable hardware devices e.g. FPGA, programmable logic devices, etc.; or using software executed by different kinds of processors; or using the integration of the hardware and software. The software application and program codes for implementing the invention can be programmed using object-oriented languages like Java, Smalltalk, C++, etc., or the traditional procedural languages like C language or other similar languages, or the combination thereof. The source code can be executed locally or remotely to realize defined operation.

The above-described exemplary embodiments are intended to be illustrative in all respects of the method and apparatus for assisting in delivering update contents, rather than restrictive, of the present invention. Those skilled in the art should recognize that the present invention is capable of many variations and modifications within the scope and spirit of the present invention. The scope of the present invention is defined only by the appended claims.

The invention claimed is:

1. A method on a peer client for assisting in delivering update contents in a computer network, the method comprising:

communicatively coupling a first peer client to at least one other peer client on a computer network including a server;

receiving at the first peer client at least one update notifications from the server, the at least one update notification having been received by the server from the at least one other peer client;

identifying, with at least one computer processor, friends involved an interaction history of a user of the first peer client with the server;

calculating, with at least one computer processor, a concern degree $d_m = C_{m,n}/a_m$ of the user n for each friend m, where $C_{m,n}$ is number of interactions between the friend m and the user n, and where $a_m$ is number of update notifications made by the friend m;

creating, with at least one computer processor, a friend list consisting of friends that have a concern degree higher than a threshold;

evaluating with at least one computer processor, a user's an interaction preference of the user according to a user's interaction history utilizing at least the friend list, wherein the friend list is created by considering a hit ratio $h_n$ as follows $$h_n \sum_{m=0}^{M_n-1} p_{m,n} \cdot s_{m,n} = \sum_{m=0}^{M_n-1} \frac{C_{m,n}}{\sum_{m=0}^{M_n-1} C_{m,n}} \cdot s_{m,n},$$

where $P_{m,n}$ is $C_{m,n}$ divided by number of interactions of user n with all users and where $S_{m,n}=1$ when user m is added to the friend list and $S_{m,n}=0$ when user m is not added to the friend list;

in response to an update notification received fromt the server, determining whether to prefetch update contents corresponding to the update notification according to the interaction preference; and in response to evaluating to prefetch, obtaining the update contents directly from the at least one other peer client in a peer-to-peer manner and storing the update contents locally on the first peer client.

2. The method of claim 1, wherein the first peer client includes a browser, and including the step of:

obtaining the user's interaction history by at least one of capturing user operations and capturing communications data of the browser.

3. The method of claim 1, wherein the step of evaluating comprises creating a content type list according to content types involved in the user's interaction history, and evaluating the user's interaction preference utilizing at least the content type list.

4. The method of claim 1, wherein the step of evaluating comprises creating a keyword list according to keywords involved in the interaction history, and evaluating the user's interaction preference utilizing at least the keyword list.

5. The method of claim 1, further comprising:

publishing the user's update contents and storing the user's update contents at the first peer client.

6. The method of claim 1, wherein the computer network further comprises a network management device configured to deploy the network transmission between peer clients in the computer network.

7. The method of claim 6, further comprising:

publishing the user's update contents, which comprises sending a publishing request to the network management device, receiving a returned content ID from the network management device, storing the user's update contents and the returned content ID at the first peer client, and sending the update contents and the returned content ID to the server, such that the server may contain the returned content ID in the update notification when generating the update notification.

8. The method of claim 6, wherein the step of obtaining the update contents comprises, extracting the returned content ID contained in the update notification, sending a request for obtaining the update contents to the network management device using the returned content ID, and obtaining the update contents from the at least one other peer client based on returned connection information from the network management device.

9. An assistant apparatus at a client, the assistant apparatus for assisting in delivering update contents in a computer network, the computer network including a server and at least one peer client, the assistant apparatus comprising:

a prefetching unit, comprising a memory and a processor, configured to receive, from the server, update notifications received by the server from the at least one peer;

an evaluating unit, comprising a memory and a processor, configured to:

identify friends involved an interaction history of a user of the client with the server, calculate a concern degree $d_m = C_{m,n}/a_m$ of the user n for each friend m, where $C_{m,n}$ is number of interactions between the friend m and the user n, and where $a_m$ is number of update notifications made by the friend m, create a friend list consisting of friends that have a concern degree higher than a threshold, and evaluate an interaction preference of the user utilizing at least the friend list wherein the evaluating unit creates the friend list by considering a hit ratio $h_n$ as follows $$h_n \sum_{m=0}^{M_n-1} p_{m,n} \cdot s_{m,n} = \sum_{m=0}^{M_n-1} \frac{C_{m,n}}{\sum_{m=0}^{M_n-1} C_{m,n}} \cdot s_{m,n},$$

where $P_{m,n}$ is $C_{m,n}$ divided by number of interactions of user n with all users, and where $S_{m,n}=1$ when user m is added to the friend list and $S_{m,n}=0$ when user m is not added to the friend list; and a prefetching unit configured to determine, in response to an update notification received from the server, whether to prefetch update contents corresponding to the update notification according to the interaction preference, and, if prefetching, send a request for the update contents to the at least one peer client, obtain the update contents directly from the at least one peer client in a peer-to-peer manner and store the update contents at the client.

10. The assistant apparatus of claim 9, wherein the client includes a browser for communicating with the server, and wherein the evaluating unit is configured to obtain the user's interaction history by at least one of capturing user operations and capturing communications data of the browser.

11. The assistant apparatus of claim 9, wherein the evaluating unit is configured to create a content type list according to content types involved in the user's interaction history, and to evaluate the user's interaction preference utilizing at least the content type list.

12. The assistant apparatus of claim 9, wherein the evaluating unit is configured to create a keyword list according to keywords involved in the user's interaction history, and to evaluate the user's interaction preference utilizing at least the keyword list.

13. The assistant apparatus of claim 9, wherein the assistant apparatus further comprises:

a publishing unit configured to publish the user's update contents, and store the user's update contents at the client.

14. The assistant apparatus of claim 9, wherein the computer network further comprises a network management device configured to deploy the network transmission between peer clients in the computer network.

15. The assistant apparatus of claim 14, wherein the assistant apparatus further comprises:

a publishing unit configured to send a publishing request to the network management device, receive a returned content ID from the network management device, store the user's update contents and the returned content ID locally, and send the update contents and the returned content ID to the server, such that the server may contain the returned content ID in the update notification when generating the update notification.

16. The assistant apparatus of claim 14, wherein the prefetching unit is configured to extract the returned content ID contained in the update notification, send a request for obtaining the update contents to the network management device using the returned content ID, and obtain the update contents directly from the at least one peer client based on returned connection information from the network management device.

17. A non-transitory computer program product tangibly embodying computer readable instructions which, when implemented, cause a computer to carry out the steps of a method for assisting in delivering update contents in a computer network, comprising:

communicatively coupling a first peer client to at least one other peer client on a computer network including a server;

receiving at the first peer client an update notification from the server, the update notification having been received by the server from the at least one other peer client;

identifying, with at least one computer processor, friends involved an interaction history of a user of the first peer client with the server;

calculating, with at least one computer processor, a concern degree $d_m=C_{m,n}/a_m$ of the user n for each friend m, where $C_{m,n}$ is number of interactions between the friend m and the user n, and where $a_m$ is number of update notifications made by the friend m;

creating, with at least one computer processor, a friend list consisting of friends that have a concern degree higher than a threshold;

evaluating, with at least one computer processor, a user's an interaction preference of the user according to a user's interaction history utilizing at least the friend list, wherein the friend list is created by considering a hit ratio $h_n$ as follows $$h_n \sum_{m=0}^{M_n-1} p_{m,n} \cdot s_{m,n} = \sum_{m=0}^{M_n-1} \frac{C_{m,n}}{\sum_{m=0}^{M_n-1} C_{m,n}} \cdot s_{m,n},$$

where $P_{m,n}$ is $C_{m,n}$ divided by number of interactions of user n with all users and where $S_{m,n}=1$ when user m is added to the friend list and $S_{m,n}=0$ when user m is not added to the friend list;

in response to the update notification, determining whether to prefetch update contents corresponding to the update notification according to the interaction preference; and in response to evaluating to prefetch, obtaining the update contents directly from the at least one other peer client in a peer-to-peer manner and storing the update contents locally on the first peer client.

18. The non-transitory computer program product according to claim 17, wherein the first peer client includes a browser, and including the step of obtaining the user's interaction history by at least one of capturing user operations and capturing communications data of a browser.

19. The non-transitory computer program product according to claim 17, wherein the step of evaluating comprises creating a content type list according to content types involved in the user's interaction history, and evaluating the user's interaction preference utilizing at least the content type list.

20. The non-transitory computer program product according to claim 17, wherein the step of evaluating comprises creating a keyword list according to keywords involved in the user's interaction history, and evaluating the user's interaction preference utilizing at least the keyword list.

21. The assistant apparatus of claim 9, wherein the evaluating unit creates the friend list by considering a bandwidth consumption $w_n$ as follows $$w_n = \frac{\sum_{m=0}^{M_{n-1}} ((a_m - c_{m,n}) \cdot s_{m,n})}{\sum_{m=0}^{M_{n-1}} (a_m - c_{m,n})}.$$

22. The assistant apparatus of claim 21, wherein the evaluating unit creates the friend list by choosing a set $\{S_{0,n}, S_{1,n}, \ldots, S_{M-1,n} | S_{m,n} = 0 \text{ or } 1\}$ that makes a largest utility function $U_n$ as follows $$U_n = \frac{h_n}{a + bw_n},$$

wherein a and b are parameters that balance a weight of $h_n$ and a weight of $w_n$.

23. The method of claim 1, wherein the friend list is created by considering a bandwidth consumption $w_n$ as follows $$w_n = \frac{\sum_{m=0}^{M_{n-1}} ((a_m - c_{m,n}) \cdot s_{m,n})}{\sum_{m=0}^{M_{n-1}} (a_m - c_{m,n})}.$$

24. The method of claim 23, wherein the friend list is created by choosing a set $\{S_{0,n}, S_{1,n}, \ldots, S_{M-1,n} | S_{m,n} = 0 \text{ or } 1\}$ that makes a largest utility function $U_n$ as follows $$U_n = \frac{h_n}{a + bw_n},$$

wherein a and b are parameters that balance a weight of $h_n$ and a weight of $w_n$.

* * * * *